(12) United States Patent
Guerrato et al.

(10) Patent No.: US 10,570,860 B2
(45) Date of Patent: Feb. 25, 2020

(54) REGULATOR

(71) Applicant: DELPHI TECHNOLOGIES IP LIMITED, St. Michael (BB)

(72) Inventors: Diego Guerrato, London (GB); Kartik Rajaram, Maidstone Kent (GB)

(73) Assignee: DELPHI TECHNOLOGIES IP LIMITED (BB)

( * ) Notice: Subject to any disclaimer, the term of this patent is extended or adjusted under 35 U.S.C. 154(b) by 13 days.

(21) Appl. No.: 15/753,184

(22) PCT Filed: Aug. 16, 2016

(86) PCT No.: PCT/EP2016/069447
§ 371 (c)(1),
(2) Date: Feb. 16, 2018

(87) PCT Pub. No.: WO2017/029296
PCT Pub. Date: Feb. 23, 2017

(65) Prior Publication Data
US 2018/0238278 A1 Aug. 23, 2018

(30) Foreign Application Priority Data
Aug. 18, 2015 (GB) .................................. 1514625.1

(51) Int. Cl.
*F02M 37/00* (2006.01)
*F16K 17/08* (2006.01)
(Continued)

(52) U.S. Cl.
CPC .... *F02M 37/0052* (2013.01); *F02M 37/0029* (2013.01); *F16K 17/046* (2013.01);
(Continued)

(58) Field of Classification Search
CPC .......... F02M 37/0052; F02M 37/0029; F02M 59/46; G05D 16/106; F16K 17/046; F16K 17/04; F16K 17/082
See application file for complete search history.

(56) References Cited

U.S. PATENT DOCUMENTS 5,186,147 A * 2/1993 Bellis ................. F02M 37/0029
123/452
5,339,785 A 8/1994 Wilksch
(Continued)

FOREIGN PATENT DOCUMENTS

| DE | 102011089964 A1 | 6/2013 |
| DE | 102012212756 A1 | 1/2014 |
| DE | 102013200050 A1 | 7/2014 |

*Primary Examiner* — Joseph J Dallo
(74) *Attorney, Agent, or Firm* — Joshua M. Haines

(57) ABSTRACT

A low pressure regulator for a high pressure fuel pump includes a standard damping orifice, providing a constant level of piston movement damping by enabling a fluid pathway between a spring chamber and a return line. The low pressure regulator also includes a further damping orifice, which is covered by the piston when discharge port holes are open, the further damping orifice providing a further, variable level of piston movement damping by providing a further fluid pathway between the spring chamber and return line. The further damping orifice is open in a hydraulic accumulator mode and closed in a regulator mode, thereby reducing pressure spikes caused by insufficient spring chamber filling.

4 Claims, 4 Drawing Sheets

(51) Int. Cl.
*F16K 17/04* (2006.01)
*G05D 16/10* (2006.01)
*F02M 59/46* (2006.01)

(52) U.S. Cl.
CPC ......... *F16K 17/082* (2013.01); *G05D 16/106* (2013.01); *F02M 59/46* (2013.01)

(56) References Cited

U.S. PATENT DOCUMENTS

| | | | | |
|---|---|---|---|---|
| 5,441,026 | A | * | 8/1995 | Akimoto ............... F02D 33/006 123/198 D |
| 8,371,268 | B2 | | 2/2013 | Masellis et al. |
| 2001/0027719 | A1 | * | 10/2001 | Wahlberg ............ F15B 15/1476 92/134 |
| 2003/0219346 | A1 | * | 11/2003 | Abe ....................... F02M 55/04 417/307 |
| 2010/0006072 | A1 | * | 1/2010 | Tashima ............. F02M 37/0052 123/511 |
| 2010/0242915 | A1 | | 9/2010 | Masellis et al. |
| 2010/0258092 | A1 | | 10/2010 | Ammon |
| 2015/0013776 | A1 | * | 1/2015 | Lammers ............. G05D 16/106 137/14 |

\* cited by examiner

REGULATOR

CROSS REFERENCE TO RELATED APPLICATIONS

This application is a national stage application under 35 USC 371 of PCT Application No. PCT/EP2016/069447 having an international filing date of Aug. 16, 2016, which is designated in the United States and which claimed the benefit of GB Patent Application No. 1514625.1 filed on Aug. 18, 2015, the entire disclosures of each are hereby incorporated by reference in their entirety.

TECHNICAL FIELD

The present invention relates to a regulator, and specifically to a regulator for a high pressure fuel pump.

BACKGROUND OF THE INVENTION

Known high pressure fuel pumps include a high pressure circuit which delivers highly pressurised fuel to a rail, and a low pressure circuit.

A nominal pressure within the low pressure circuit must be kept almost constant at all running conditions, regardless of running speed, room temperature, fuel demand etc. If pressure within the low pressure circuit exceeds a given threshold, this can lead to poor performance of the fuel pump, or even system failure.

To achieve a constant pressure in the low pressure circuit, it is known to use a low pressure regulator (LPR) as part of the circuit. The LPR regulates pressure within the low pressure circuit by dumping fuel into a return line when pressure exceeds a given threshold.

A known LPR 2 is illustrated in FIG. 1, and includes a body 4, a piston 6, and a spring 8, located in a spring chamber 10 formed in an interior of the body 4. The spring chamber 10, and a damping orifice 12, one end of which communicates with the spring chamber 10 and the other end with a return line 14, provide for damping of the piston 6 during movement.

Discharge port holes 16 provided in the body 4 are uncovered by the piston when its lift exceeds a certain distance. The LPR 2 operates in two modes; the mode in which it is operating at a particular time is determined by the location of the piston 6 with respect to the body 4, i.e. the lift of the piston 6. The two modes are hydraulic accumulator mode, and regulator mode.

The damping orifice 12 is located such that it is not obstructed by the piston 6 in any operational positon of the piston 6, such that a constant level of damping is provided by the damping orifice 12 and spring chamber 10.

The known LPR 2 acts like a mass-spring-damper system excited by an oscillating force. However, for large, and very fast pressure changes, oscillation of the piston 6 could be so rapid that the spring chamber 10 will only be partially filled, and therefore will be unable to provide damping of the movement of the piston 6.

The known LPR 2 could therefore run in a damped or an un-damped mode, depending on the sufficiency of filling of the spring chamber 10. Under certain conditions, when the LPR 2 transits from the damped to the un-damped mode, voids in the spring chamber 10 collapse, generating undesirable pressure spikes which propagate within the low pressure circuit.

An increased size of damping orifice 12 mitigates the problem of partial filling of the spring chamber 10 and resulting pressure spikes, however a larger damping orifice 12 reduces the damping effect of the spring chamber 10 when it is fully filled.

SUMMARY OF THE INVENTION

It is an object of the present invention to provide a regulator which at least mitigates the problems encountered with known embodiments.

Accordingly the present invention provides, in a first aspect, a regulator including a body; a spring located within a spring chamber formed in an interior of the body; a piston located between the spring chamber and a first end of the low pressure regulator; at least one discharge port hole, and a first damping orifice which provides a constant fluid pathway between the spring chamber and a return line, such that the first damping orifice and the spring chamber provide a first, constant level of damping of movement of the piston; and at least one further damping orifice, which communicates with the interior of the low pressure regulator and with the return line. The piston is movable within the interior of the body between a closed position and a fully open position. When the piston is in the closed position, each discharge port hole is blocked by an outer wall of the piston, and when the piston is in the fully open position, a first fluid pathway is enabled between the interior of the low pressure regulator and the return line through each discharge port hole. When the piston is in the closed position, the at least one further damping orifice provides a second fluid pathway between the spring chamber and the return line, and when the piston is in the fully open position, the at least one further damping orifice is blocked by the outer wall of the piston; such that the at least one further damping orifice and the spring chamber provide a second, variable level of damping of movement of the piston.

In one embodiment of the present invention, when the piston is at a certain position between the closed position and the fully open position, the or each discharge port holes, and the or each further damping orifice, are blocked by the outer wall of the piston.

In an alternative embodiment of the present invention, when the piston is at a certain position between the closed positon and the fully open position, the or each discharge port holes are blocked by the outer wall of the piston, and the or each further damping orifice is partially blocked by the outer wall of the piston.

In a further alternative embodiment of the present invention, when the piston is at a certain position between the closed positon and the fully open position, the or each discharge port holes are not blocked by the outer wall of the piston, and the or each further damping orifice are not blocked by the outer wall of the piston.

BRIEF DESCRIPTION OF THE DRAWINGS

The present invention is now described by way of example with reference to the accompanying drawings in which.

DESCRIPTION OF THE PREFERRED EMBODIMENTS

An embodiment of the present invention is described below in relation to the orientation of the figures. Terms such as upper, lower, above, below, top, bottom, horizontal and vertical are not intended to be limiting.

Figure 1:
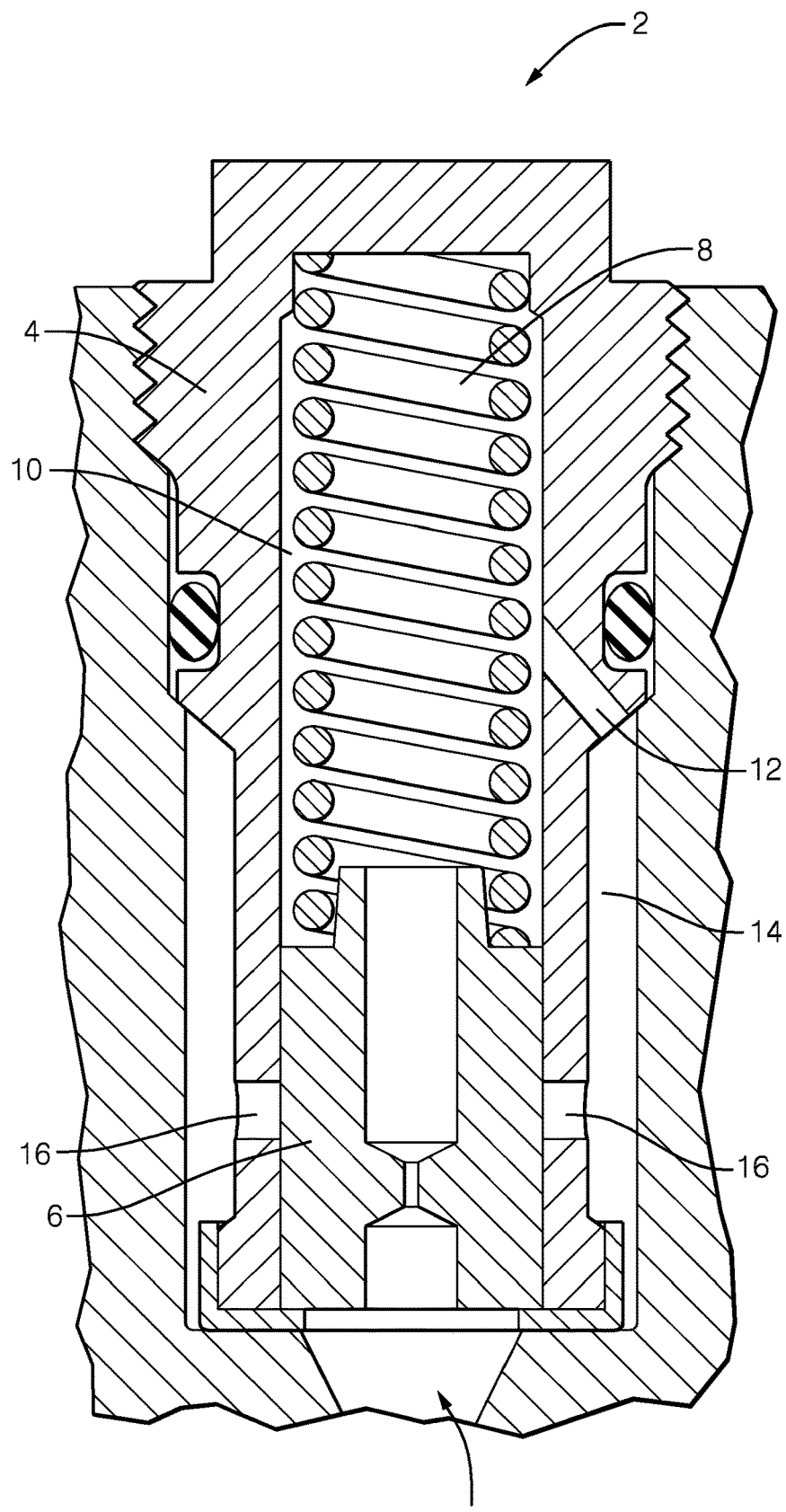
FIG. 1 is longitudinal cross-sectional view of a known regulator.
Figure 2:
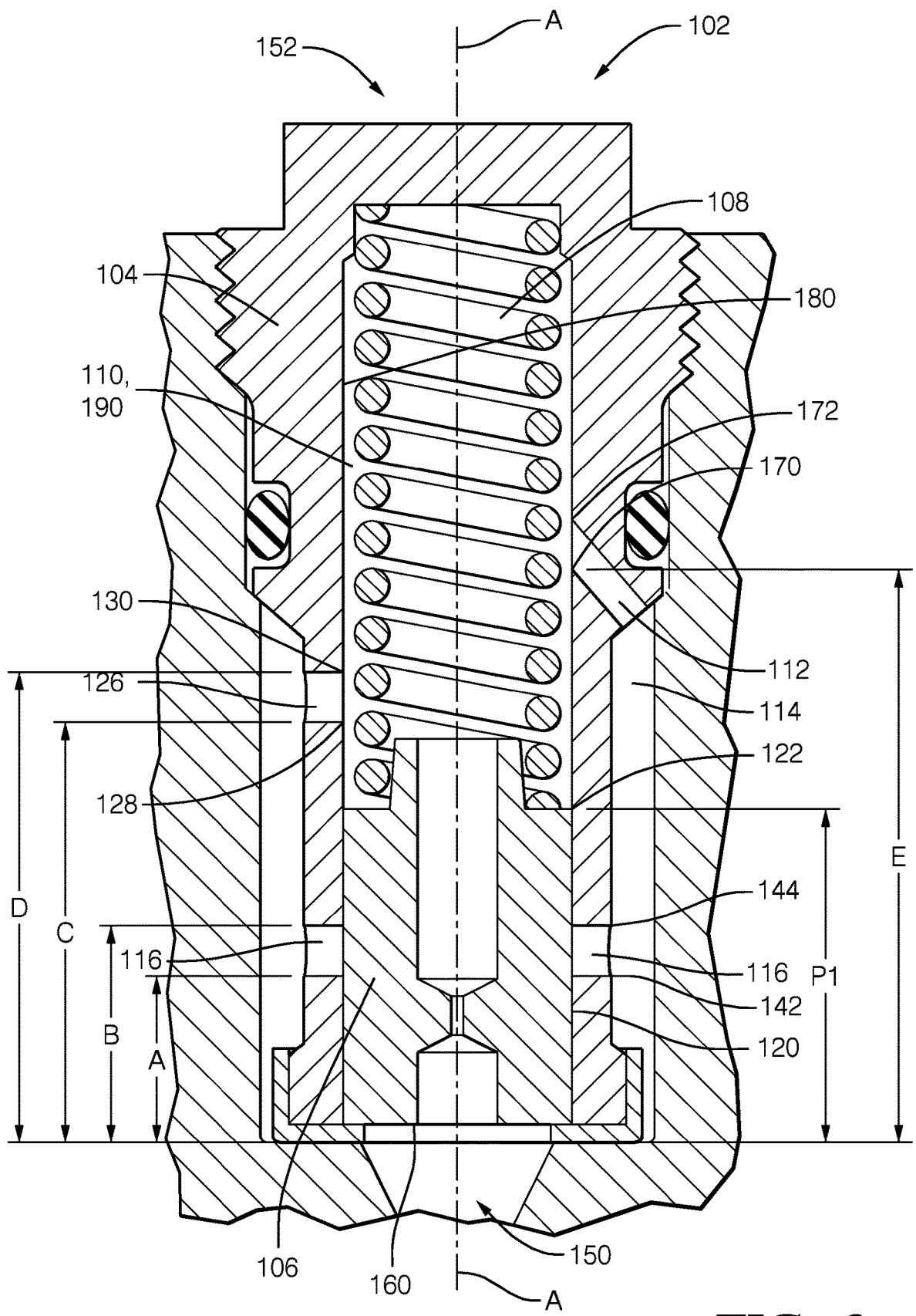
FIG. 2 is a longitudinal cross-sectional view of a regulator in accordance with a first embodiment the present invention, in a closed position.
Figure 3:
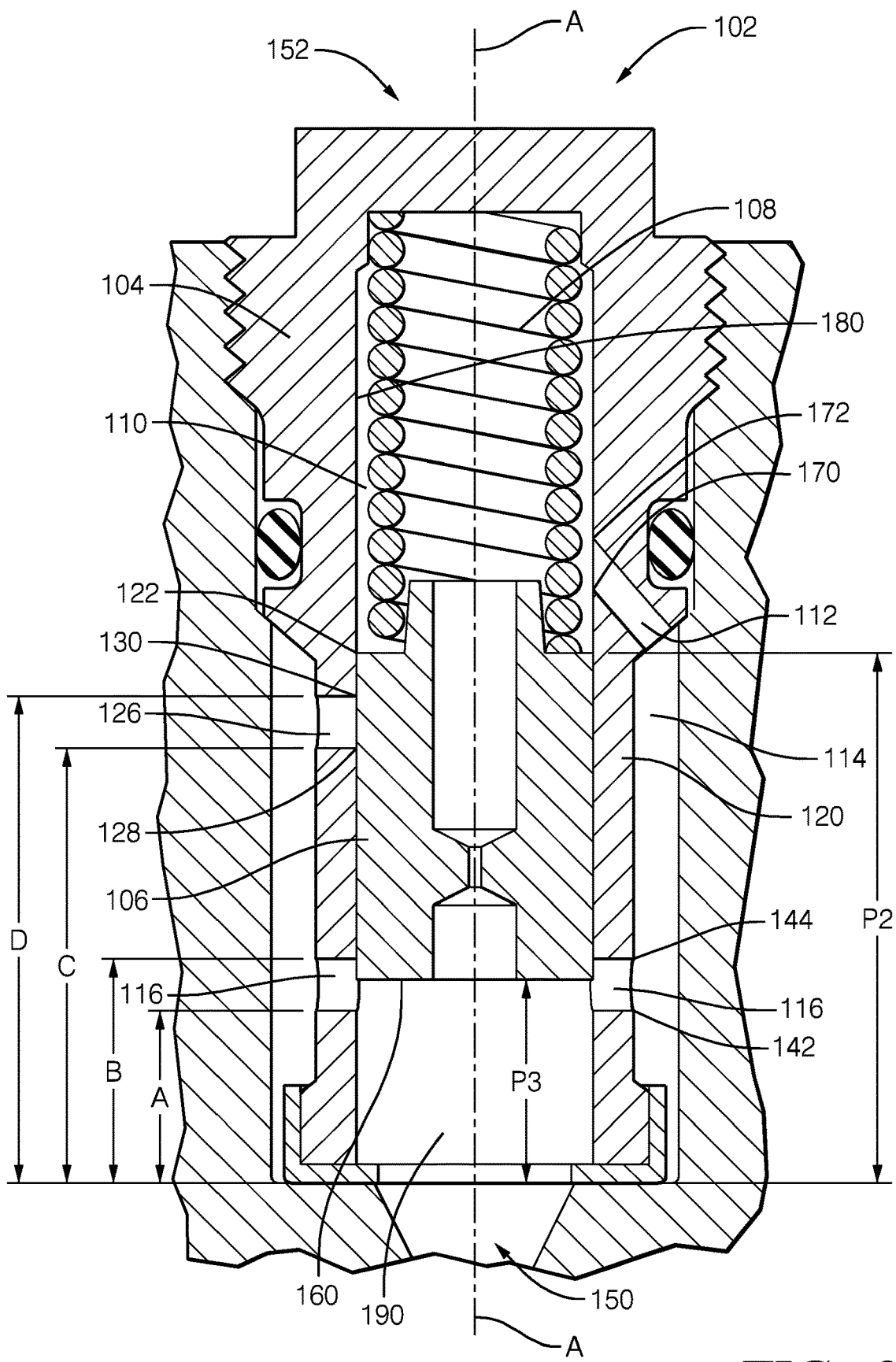
FIG. 3 is a longitudinal cross-sectional view of a regulator in accordance with the first embodiment of the present invention, in an open position.

Referring to FIGS. 2 and 3, a first embodiment of the present invention comprises a low pressure regulator (LPR) 102, comprising a body 104, a piston 106, and a spring 108 located within a spring chamber 110 formed in an interior 190 of the body 104.

The piston 106 is located towards a first, lower end 150 of the LPR 102, and the spring chamber 110 is located towards a second, upper end 152 of the LPR remote from the lower end 150.

A first, standard damping orifice 112 is provided in the body 104, wherein one end of the first damping orifice 112 communicates with the spring chamber 110 and another end with a return line 114.

Discharge port holes 116 are also provided in the body 104, providing an optional fluid pathway between the interior 190 of the LPR 102 and the return line 114.

The LPR 102 can be in a fully closed position, a fully open position, or a partially open positon. In the fully closed position, as illustrated in FIG. 2, the piston 106 is at a minimum distance from the first, lower end 150 of the LPR 102. In the fully open position, as illustrated in FIG. 3, the piston 106 is at a maximum distance from the lower end 150 of the LPR 102. In the partially open position, the piston 106 is located between the minimum and maximum distances from the lower end 150 of the LPR 102.

Fluid pressure in the low pressure system exerts pressure on a first, lower end 160 of the piston 106. When the fluid pressure, and therefore the pressure exerted on the lower end 160 of the piston 106 exceeds a predetermined threshold the piston 106 is caused to move upwardly (in the orientation of the figures) into the spring chamber 110, against the force of the spring 108. The piston 106 moves upwardly from the closed position to the fully open positon.

An outer wall 120 of the piston 106 is in contact with part of an inner wall 180 of the LPR 102. The outer wall 120 of the piston 106 has a first, upper wall boundary 122, remote from the first, lower end 150 of the LPR 102, and a second, lower wall boundary, closer to the first, lower end 150 of the LPR 102.

When the LPR 102 is in a fully closed position of FIG. 2, the wall upper boundary 122 of the piston 106 is at a first distance P1 (in the direction of a longitudinal axis A of the LPR 102) from the first, lower end 150 of the LPR 102. In the fully open position of FIG. 3, the wall upper boundary 122 is at a second distance P2 in the direction of axis A from the first, lower end 150 of the LPR 102 (wherein the second distance P2 is greater than the first distance P1).

The travel of the piston 106, i.e. the movement of the piston 106 between a fully open and a fully closed positon, is therefore P2 minus P1.

The end of the first damping orifice 112 which is closest to and communicates with the spring chamber 110 has a first damping orifice lower boundary 170, closest to the lower end 150 of the LPR 102, and a first damping orifice upper boundary 172, further away from the lower end 150 of the LPR 102 than the first damping orifice lower boundary 170.

The first damping orifice 112 is located such the first damping orifice lower boundary 170 is at a distance E from the first, lower end 150 of the LPR 102. Distance E is greater than a the second wall boundary distance P2 (and therefore also the first wall boundary distance P1), therefore the first damping orifice 112 is not obstructed by the wall 120 of the piston 106 at any position of the LPR 102. Accordingly, the first damping orifice 112, and the spring chamber 110, provide a first, constant level of damping of the movement of the piston 106.

The ends of each of the discharge port holes 116 which are closest to and communicate with the interior 190 of the LPR 102 have a port hole lower boundary 142, closest to the lower end 150 of the LPR 102, and a port hole upper boundary 144, further away from the lower end 150 of the LPR 102 than the port hole lower boundary 142.

The discharge port holes 116 are located such that the port hole lower boundaries 142 are at distance A (in the direction of axis A) from the first, lower end 150 of the LPR 2, and the port hole upper boundaries 144 are at a distance B (in the direction of axis A) from the lower end 150 of the LPR 102.

Distances A and B are less than the first wall boundary distance P1, therefore when the piston 106 is in the closed position of FIG. 2, the discharge port holes 116 are covered by the outer wall 120 of the piston 106.

Furthermore, distance A is less than the travel of the piston 106, such that when the LPR 102 is in the open position of FIG. 3, the discharge port holes 116 are at least partially uncovered by the piston 106. Alternatively, both distances A and B can be less than the travel of the piston 106, such that the discharge port holes 116 are fully uncovered when the LPR 102 is in the fully open position.

Accordingly, when the LPR 102 is in the closed positon, fluid cannot pass through the discharge port holes 116 from the interior 190 of the LPR 102 to the return line 114, however when the LPR 102 is in the fully open position, a fluid pathway is enabled from the interior 190 of the LPR 102 to the return line 114.

In common with the prior art embodiment, the LPR 102 is operable in two modes, depending on the position of the piston 106 with respect to the body 104, i.e. the lift of the piston 106.

The first mode is a hydraulic accumulator mode, i.e. when the piston 116 is in the closed position, or has not lifted sufficiently to uncover the discharge port holes 116.

The second mode is a regulator mode, when the piston 106 has moved upwardly sufficiently to at least partially uncover the discharge port holes 116, and a fluid pathway is enabled from the interior 190 of the LPR 102 to the return line 114 via the discharge port holes 116.

A further damping orifice 126 is provided through the body 104. One end of the further damping orifice 126 communicates with the interior 190 of the LPR 102, and the other end with the return line 114.

As explained in greater detail below, the further damping orifice 126 provides a further, variable level of damping, in addition to the constant level of damping provided by the first damping orifice 112. The further damping orifice 126 is open, i.e. a fluid flow path is enabled from the interior 190 of the LPR 102 to the return line 144 through the further damping orifice, when little damping is required, and becomes progressively less open as more damping of the movement of the piston 106 is required. When the highest level of damping of the movement of the piston 106 is required, the further damping orifice 126 is closed.

The end of the further damping orifice 126 which is closest to and communicates with the interior 190 has a further damping orifice lower boundary 128, and a further damping orifice upper boundary 130, which is further away from the first end 150 of the LPR 102 than the further damping orifice lower boundary 128.

The further damping orifice 126 is located such the further damping orifice lower boundary 128 is at a distance C (in the direction of axis A) from the first, lower end 150 of the LPR 102, and the further damping orifice upper boundary 130 is at a distance D from the lower end 150 of the LPR 102.

Distances C and D are greater than first wall boundary distance P1, but less than the second wall boundary distance P2.

When the LPR 102 is operating in the hydraulic accumulator mode, for example as illustrated in FIG. 2, less damping of the movement of the piston 106 is usually required, because it is desirable that the piston 106 moves quickly to accommodate fluid flow entering the LPR 102.

In the hydraulic accumulator mode, the further damping orifice 126 is not covered by the outer wall 120 of the piston 106, therefore the fluid flow path between the interior 190, and specifically the spring chamber 110, and the return line 114, is enabled.

As fluid pressure causes the piston 106 to begin to move upwardly, i.e. away from the lower end 150 of the LPR 102, the wall upper boundary 122 of the piston 106 moves closer to the further damping orifice 126. As the piston 106 moves further upwardly, the outer wall 120 initially partially blocks, then completely blocks, the further damping orifice 126. Once the further damping orifice 126 is blocked by the wall 120, the fluid flow path from the spring chamber 110 to the return line 114 through the further damping orifice 126 is prevented.

In the embodiment illustrated in FIGS. 2 and 3, the length of the piston 106 in the direction of axis A is equal to distance D minus distance A. Therefore, when the first, lower end 160 of the piston 106 is at distance A away from the first, lower end 150 of the LPR 102 (i.e. when the lower end 160 of the piston 106 is level with the port hole lower boundary 142), the wall boundary 122 is level with the further damping orifice upper boundary 130. At this position of the piston 106, part way between the closed and the fully open positions, both the discharge port holes 116 and the further damping orifice 126 are covered by the outer wall 120 of the piston 106.

Subsequent upward movement of the piston 106 causes the discharge port holes 116 to become uncovered; the LPR 102 then runs in the regulator mode. In the regulator mode, where fluid is flowing through the discharge ports 116, more control of the lift of the piston 106 is required to cope with the incoming flow. This is enabled as the further damping orifice 126 is covered by the outer wall 120 of the piston 106 in the regulator mode.

Due to the above considerations, i.e. less damping being required in the hydraulic accumulator mode, and more in the regulator mode, the second, further damping orifice 126 is located such that it is covered by the piston 106 as the discharge ports 116 are opened, i.e. as they become uncovered by the piston 106.

Figure 4:
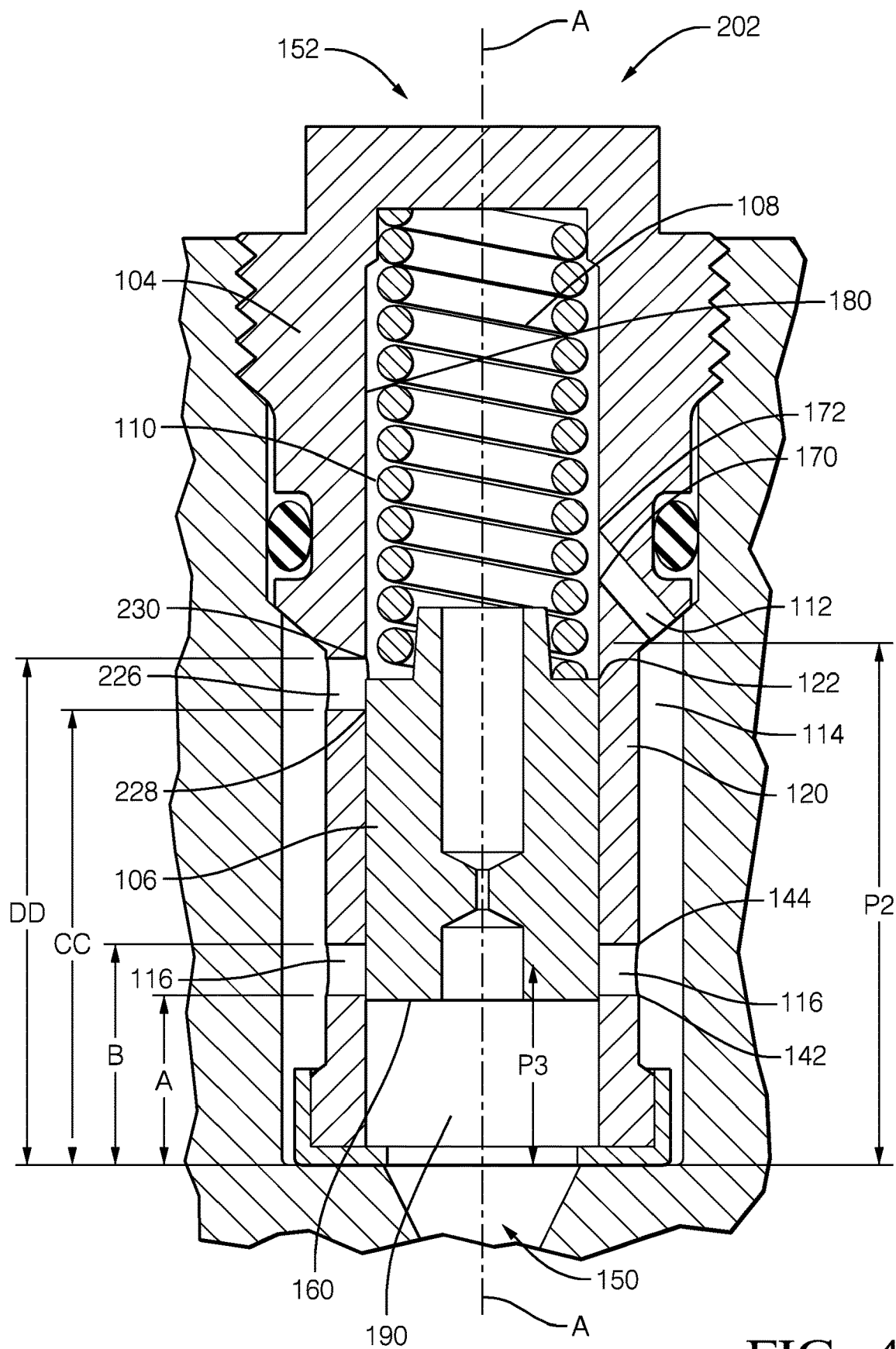
FIG. 4 is a longitudinal cross-sectional view of a regulator in accordance with a second embodiment of the present invention, part way between a closed and a fully open position.

FIG. 4 illustrates an LPR 202, in accordance with an alternative embodiment of the present invention. Like features are numbered in accordance with the first embodiment, and the alternative LPR 202 operates in the same manner as the LPR 102 of the first embodiment.

The alternative LPR 202 comprises a further damping orifice 226, which is located further away from the first end 150 of the LPR 202, and further away from the discharge port holes 116, than the further damping orifice 126 of the first embodiment.

The end of the further damping orifice 226 of the second embodiment which is closest to and communicates with the interior 190 has a further damping orifice lower boundary 228, and a further damping orifice upper boundary 230, which is further away from the first end 150 of the LPR 102 than the further damping orifice lower boundary 228.

The further damping orifice 226 of the second embodiment is located such the further damping orifice lower boundary 228 is at a distance CC (in the direction of axis A) from the first, lower end 150 of the LPR 202, and the further damping orifice upper boundary 230 is at a distance DD from the lower end 150 of the LPR 202.

In the embodiment illustrated in FIG. 4, the length of the piston 106 in the direction of axis A is less than distance DD minus distance A, but greater than distance DD minus distance B.

FIG. 4 illustrates the piston 106 of the alternative LPR 202 part way between a closed and a fully open position. In this particular position, when the first, lower end 160 of the piston 106 is at distance A away from the first, lower end 150 of the LPR 102 (i.e. when the lower end 160 of the piston 106 is level with the port hole lower boundary 142), the wall boundary 122 is between distances CC and DD, i.e. between the further damping orifice lower boundary 228 and upper boundary 230. At this position of the piston 106, part way between the closed and the fully open positions, the discharge port holes 116 are covered by the outer wall 120 of the piston 106, and the further damping orifice 126 is partially covered by the outer wall 120 of the piston 106.

In a further alternative embodiment (not illustrated), the position of the further damping orifice 126/226 relative to the discharge port holes 116/216, and/or the length of the piston 106 could be different to the first and second embodiments, such that the further damping orifice 126/226 will become closed (i.e. covered by the outer wall 120 of the piston 106), after the opening of the discharge port holes 116 (i.e. after the discharge port holes 116 have become uncovered by the outer wall 120 of the piston 106). In this embodiment, when the piston 106 is in a certain partially open position, i.e. a certain position part way between the closed and the fully open positions, both the discharge port holes 116 and further damping orifice 226 are open, i.e. not blocked by the outer wall 120 of the piston 106.

In the illustrated embodiments, one further damping orifice 126/226 is provided. However, in alternative embodiments, more than one further damping orifice could be provided. For example, a second further damping orifice 126/226 could be provided on an opposite side of the LPR 102/202, with respect to the longitudinal axis A.

REFERENCES

Prior art
 LPR 2
 body 4
 piston 6
 spring 8
 spring chamber 10
 damping orifice 12
 return line 14
 discharge port holes 16
Invention
 LPR 102, 202
 body 104 piston 106
spring 108
spring chamber 110
first damping orifice 112
return line 114
discharge port holes 116
piston outer wall 120
outer wall upper boundary 122
outer wall lower boundary 124
further damping orifice 126, 226
further damping orifice lower boundary 128, 228
further damping orifice upper boundary 130, 230
discharge port hole lower boundary 142
discharge port hole upper boundary 144
LPR first, lower end 150
LPR second, upper end 152
first damping orifice lower boundary 170
first damping orifice upper boundary 172
piston first, lower end 160
LPR inner wall 180
interior 190
discharge port hole lower boundary distance A
discharge port hole upper boundary distance B
further damping orifice lower boundary distance C, CC
further damping orifice upper boundary distance D, DD
first damping orifice lower boundary distance E
piston upper boundary distance (closed position) P1
piston upper boundary distance (fully open position) distance P2

The invention claimed is:

1. A low pressure regulator comprising:
 a body;
 a spring located within a spring chamber formed in an interior of the body;
 a piston located between the spring chamber and a first end of the low pressure regulator;
 at least one discharge port hole, and a first damping orifice which provides a constant fluid pathway between the spring chamber and a return line, such that the first damping orifice and the spring chamber provide a first, constant level of damping of movement of the piston; and
 at least one further damping orifice, which communicates with the interior of the low pressure regulator and with the return line;
 wherein the piston is movable within the interior of the body between a closed position and a fully open position;
 wherein when the piston is in the closed position, each discharge port hole is blocked by an outer wall of the piston, and when the piston is in the fully open position, a first fluid pathway is enabled between the interior of the low pressure regulator and the return line through each discharge port hole; and
 wherein when the piston is in the closed position, the at least one further damping orifice provides a second fluid pathway between the spring chamber and the return line, and when the piston is in the fully open position, the at least one further damping orifice is blocked by the outer wall of the piston; such that the at least one further damping orifice and the spring chamber provide a second, variable level of damping of movement of the piston.

2. A low pressure regulator as claimed in claim 1 wherein when the piston is at a certain position between the closed position and the fully open position, each discharge port hole, and each further damping orifice, are blocked by the outer wall of the piston.

3. A low pressure regulator as claimed in claim 1 wherein when the piston is at a certain position between the closed positon and the fully open position, each discharge port hole is blocked by the outer wall of the piston, and each further damping orifice is partially blocked by the outer wall of the piston.

4. A low pressure regulator as claimed in claim 1 wherein when the piston is at a certain position between the closed positon and the fully open position, each discharge port hole is not blocked by the outer wall of the piston, and each further damping orifice is not blocked by the outer wall of the piston.

* * * * *